United States Patent [19]

Hicks, Jr.

[11] Patent Number: 4,709,986
[45] Date of Patent: Dec. 1, 1987

[54] ENSHEATHED OPTICAL FIBER AND COUPLING METHOD

[75] Inventor: John W. Hicks, Jr., Northboro, Mass.

[73] Assignee: Polaroid Corporation, Cambridge, Mass.

[21] Appl. No.: 621,933

[22] Filed: Jun. 18, 1984

[51] Int. Cl.⁴ .......................... G02B 6/16; G02B 6/26
[52] U.S. Cl. ...................... 350/96.33; 350/96.10; 350/96.15; 350/96.31; 65/3.11
[58] Field of Search ............... 350/96.30, 96.31, 96.32, 350/96.33, 96.34, 96.15, 96.20; 65/3.12, 4.1

[56] References Cited

U.S. PATENT DOCUMENTS

| | | | |
|---|---|---|---|
| 3,434,774 | 3/1969 | Miller | 350/96.33 |
| 3,535,017 | 1/1968 | Miller | 350/96.30 |
| 3,712,705 | 1/1973 | Marcatili | 350/96.32 |
| 3,912,362 | 10/1975 | Hudson | 350/96.20 |
| 3,950,073 | 4/1976 | Horiguchi et al. | 350/96.33 |
| 4,039,248 | 8/1977 | Franke et al. | 350/96.23 |
| 4,129,356 | 12/1978 | Oestreich | 350/96.23 |
| 4,134,642 | 1/1979 | Kapron et al. | 350/96.33 |
| 4,264,126 | 4/1981 | Sheem | 350/96.15 |
| 4,354,736 | 10/1982 | Maklad et al. | 350/96.32 |
| 4,372,647 | 2/1983 | Okamoto et al. | 350/96.34 X |
| 4,493,530 | 1/1985 | Kajioka et al. | 350/96.34 |
| 4,493,721 | 1/1985 | Anwerda et al. | 65/3.12 |
| 4,630,889 | 12/1986 | Hicks, Jr. | 350/96.30 |
| 4,630,890 | 12/1986 | Ashkin et al. | 350/96.30 |

FOREIGN PATENT DOCUMENTS

| | | | |
|---|---|---|---|
| 0040202 | 3/1982 | Japan | 65/4.1 |
| 0202504 | 12/1982 | Japan | 65/4.1 |
| 0031568 | 7/1983 | Japan | 65/4.1 |

*Primary Examiner*—William L. Sikes
*Assistant Examiner*—Akm E. Ullah
*Attorney, Agent, or Firm*—Francis J. Caufield

[57] ABSTRACT

A single-mode optical fiber transmission line suited for coupling to another fiber through a laterally coupled splice includes a core having a selected diameter, a cladding layer that surrounds the core and has a cladding thickness between one and two core diameters, and an auxiliary cladding into which the optical fiber is nested. The auxiliary cladding has an index of refraction not substantially greater than that of the cladding layer that surrounds the core, an inside dimension greater than that of the outside dimension of the optical fiber, at least partially surrounds the optical fiber and is attached to the optical fiber at least along one lineal connection zone. An optical fiber in accordance with the present invention may be spliced by freeing the optical fiber from the auxiliary cladding by, for example, dissolving the lineal connection zone with dilute hydrofluoric acid, fracturing and removing the auxiliary cladding from the freed cladding and core structure and effecting a lateral coupling splice with a similarly prepared optical fiber.

8 Claims, 9 Drawing Figures

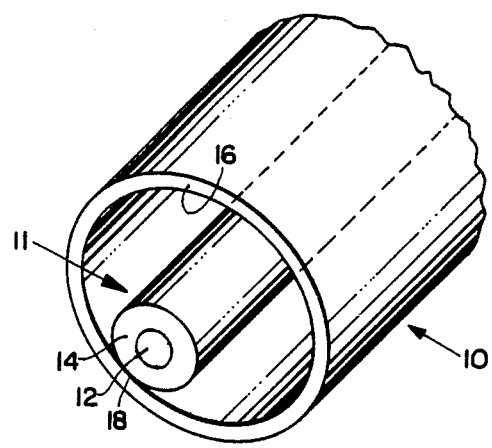
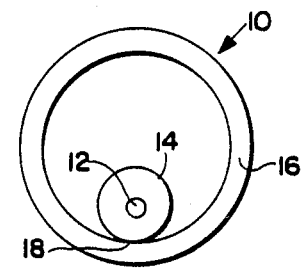
FIG. 1
FIG. 2
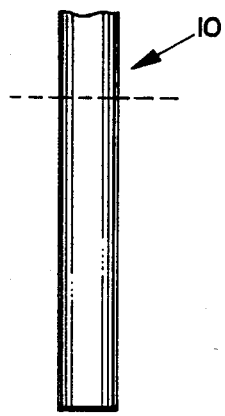
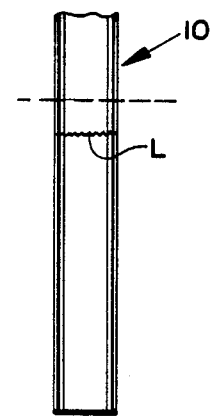
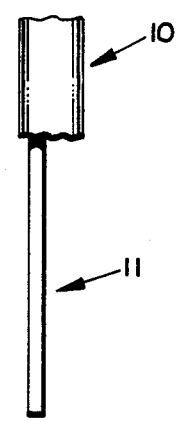
FIG. 3
FIG. 3a
FIG. 3b
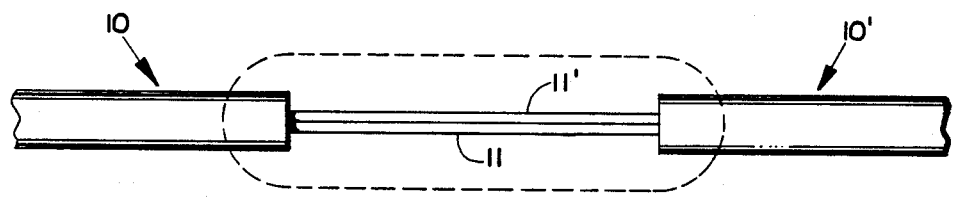
FIG. 4

ENSHEATHED OPTICAL FIBER AND COUPLING METHOD

BACKGROUND OF THE INVENTION

This invention relates to optical waveguides and more particularly to single-mode optical waveguide structures especially suited for evanescent coupling either to other waveguides or to any of several peripheral optical components used in the field of optical communications.

The principles of physical optics in the near infrared and visible light region of the electromagnetic spectrum and the application thereof to the field of optical communications are now well known. The physics of light wave transmission is explained on the basis that such waves exist as an infinite number of electromagnetic modes, each such mode having its own propagation and distribution characteristics. Because each mode of light traveling along an optical waveguide such as a glass fiber structure propagates at its own characteristic velocity, if the same information to be communicated is supplied to all modes at one end of the glass fiber, the information will be dispersed as a result of the multiple modes reaching the other end of the same fiber at different intervals of time. For this reason, the quantum of information capable of transmission along an optical waveguide is maximized when the information carrying light passing along the waveguide is restricted to a single mode.

Optical waveguides typically employ a central core of optically pure glass such as fused silica and a cladding of the same or similar glass differing only in that the glass of the cladding has a lower index of refraction than the core. The difference in the refractive indices of the core and cladding is achieved by doping either the core to increase its index of refraction or the cladding to reduce the refractive index thereof in relation to that of the core. To restrict the passage of light through such an optical waveguide to a single mode of electromagnetic energy, the diameter of the core, the wave length of light to be transmitted, and the difference between the indices of refraction in the core and cladding are interrelated. For practical single mode transmission fibers in the wavelength region between 0.8 and 1.6 microns, the core diameter must be kept in the range approximately one to five microns. Considering the diameter of a human hair is approximately fifty microns, the size of such single-mode fiber cores approaches microscopic dimensions. As a result, singlemode fibers present such problems to handling and coupling that in spite of recognized capacity, they were rejected in favor of larger, less efficient, multi-mode fiber transmission lines in the early stages of optical communications.

U.S. Pat. No. 4,315,666 issued Feb. 16, 1982 to the present inventor discloses several embodiments of rotationally non-symmetric optical waveguide fibers by which both handling and coupling problems are substantially overcome. The location of the waveguide core near one portion of the cladding periphery facilitates lateral coupling of one waveguide fiber to another by evanescence. In addition, the rotationally non-symmetric structure enables a relatively large cladding diameter for the extremely small core and thus provides an overall waveguide size which is readily handled and more easily coupled than prior single-mode waveguide structures. Prototypes embodying the fiber structures disclosed in this patent have demonstrated significant potential as a total solution to the problems associated with coupling single-mode fibers. On the other hand, there are coupling situations where the embodiments of this patent suffer some disadvantage. For example, in making a toroidal resonant cavity, using a D-shaped fiber, an axial twist of 180° is required in order to achieve the overlap needed for lateral coupling to close the loop. Similarly, where a branch line of an optical waveguide system is connected to the trunk line by a linear resonant cavity or Fabry-Perot device, it is sometimes necessary for the relatively short length of the linear resonant cavity to be twisted for suitable lateral coupling of the cavity to both the trunk and the branch line of the waveguide system.

In light of the foregoing, there is a need, therefore, for a single-mode optical waveguide fiber which can accommodate lateral evanescent coupling at more than one peripheral area while retaining ease of handling in general.

SUMMARY OF THE INVENTION

In view of the above, the present invention provides a single-mode optical fiber assembly that is conveniently handled and yet includes an inner fiber well-suited for splicing to other fibers through lateral coupling. The inner, optical fiber includes a core having a selected diameter for supporting single-mode optical signal transmissions and a primary or main cladding layer that surrounds the core. The main cladding layer has an index of refraction less than that of the core and has a cladding layer thickness between one and two times the core diameter so that the inner fiber structure has an overall diameter of between three and five core diameters. Hence, the main cladding is of a thickness sufficient to insure efficient propagation in the core, but yet thin enough to permit efficient evanescent coupling to fibers having similar cladding thickness. The core and cladding structure is nested within an auxiliary cladding which circumscribes the inner fiber. Preferably, the inner fiber is forced to stay in lineal contact with this larger auxiliary cladding in order to prevent excessive microbending losses. Thus, the inner fiber is attached to or restrained to the auxiliary cladding along at least one lineal connection or contact zone.

An optical fiber in accordance with the present invention may be efficiently spliced to an optical fiber of like construction by freeing the inner fiber from its auxiliary cladding by dissolving the lineal connection zone with hydrofluoric acid, fracturing and removing the auxiliary cladding from the freed fiber, and effecting a lateral coupling with another thinly clad fiber. Since the cladding layer that surrounds the core has a thickness between one and two core diameters, lateral coupling cladding acts to physically protect the small inner fiber to preclude unwanted contact, and to provide a relatively large diameter structure which can be easily manipulated.

A principal objective of the present invention is, therefore, the provision of an optical fiber and splicing method in which single-mode fibers can be readily manipulated and spliced. Other objects and further scope of applicability of the present invention will become apparent from the detailed description to follow, taken in conjunction with the accompanying drawings, in which like parts are designated by like reference characters.

BRIEF DESCRIPTION OF THE DRAWINGS

FIG. 1 is a partial isometric view of a first embodiment of a single-mode optical fiber in accordance with the present invention with selected portions broken away for reasons of clarity;

FIG. 2 is a cross-sectional end view of the single-mode optical fiber of FIG. 1;

FIG. 3 is a partial elevational view of the end of an optical fiber of the type illustrated in FIGS. 1 and 2;

FIG. 3A is a partial elevational view of the end portion of the optical fiber illustrated in FIG. 3 showing a portion of the auxiliary cladding fractured a selected distance from the end of the fiber;

FIG. 3B is a partial elevational view of the end portion of the optical fiber of FIG. 3A with the auxiliary cladding removed;

FIG. 4 is a side view of two optical fibers prepared in accordance with FIGS. 3-3B laterally coupled to one another;

DETAILED DESCRIPTION OF THE PREFERRED EMBODIMENTS

Figure 5:
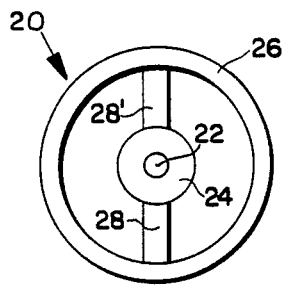
FIG. 5 is a cross-sectional end view of another embodiment of a single-mode optical fiber in accordance with the present invention.

A first embodiment of an optical fiber in accordance with the present invention is illustrated in FIGS. 1 and 2 and designated generally therein by the reference character 10. The overall optical fiber 10 includes an inner fiber 11 having a generally circular core 12 concentrically located within a main cladding 14. The core 12 has an index of refraction greater than that of the cladding and a diameter generally between one and five microns. In the preferred embodiment, the core 12 and the cladding 14 are formed from fused silica with one or both of the core or the cladding doped with one or more known dopants to achieve the desired relative difference in the indices of refraction. In accordance with one feature of the present invention, the cladding 14 has a wall thickness of between one and two core diameters to provide a structure having an overall diameter of between three and five core diameters. This dimensional relationship between the core 12 and the cladding 14 allows for efficient lateral coupling between fibers of like construction since a closer core-to-core distance can be attained to provide more efficient evanescent field coupling, as explained in Applicant's prior U.S. Pat. No. 4,315,666.

An auxiliary cladding 16 providing a cladding tube surrounds the main cladding 14 and, as shown in FIGS. 1 and 2, has an inside diameter dimension that is greater than that of the outside diameter dimension of the cladding 14 so that the inner fiber 11 is at least partially surrounded by air within the auxiliary cladding 16. The core 12 and cladding 14 structure providing inner fiber 11 is bonded or connected to the interior wall surface of the auxiliary cladding 16 along a lineally extending connection zone 18. By securing the core 12 and cladding 14 structure to the interior wall of the auxiliary cladding 16, the core and cladding cannot wander positionally in the auxiliary cladding. Accordingly, problems associated with microbending and the attendant energy losses are minimized. The connection between the inner fiber 11 and the auxiliary cladding 16 can be established by drawing both together using an appropriately configured drawing die. Further, the inner fiber 11 can be fixed to auxiliary cladding after simultaneous drawing of both by flowing a suitable fiber cement through the auxiliary cladding 16 to bond the inner fiber 11 at its point of contact to the auxiliary cladding 16. Known fiber cementing compounds including clear silicone adhesives are suitable for this purpose.

The index of refraction of the auxiliary cladding 16, while preferably equal to or less than that of the cladding 14, should not be substantially greater than that of the cladding 14. For example, the index $n_3$ of the auxiliary cladding 16 should not exceed the index $n_2$ of cladding 14 plus one-quarter of the difference between the indexes $n_2$ and $n_1$ of the cladding and core. Thus $$n_3 \leq n_2 + \tfrac{1}{4}(n_1 - n_2)$$

This index of refraction of the auxiliary cladding 16 along the connection zone 18 and the lower index of refraction of the air that surrounds the cladding 14 assists in preventing optical energy from escaping the cladding layer 14.

The auxiliary cladding 16 also serves to protect the very thin core 12 and its relatively thin cladding 14 from contamination and physical damage. Since the tolerance for elongation of the core 12 and cladding 14 structure increases with decreased overall diameter of these two components relative to the larger diameter cladding 16, the auxiliary cladding 16 will fracture first when the fiber 10 is unduly stressed and, in effect, serves as a sacrificial sheath that can preserve the integrity of the core 12 and cladding layer 14 when the optical fiber 10 is subject to above-normal handling stress. A fractured auxiliary cladding 16 can be repaired, as described more fully below.

The optical fiber 10 of FIGS. 1 and 2 is well suited to lateral coupling type splices between optical fibers of like construction as illustrated if FIGS. 3-4. As shown in FIG. 3, the end of an optical fiber 10 can be dipped in dilute hydrofluoric acid which then rises into the auxiliary cladding 16 by capillary action to surround the cladding layer 14 and the connection zone 18. The distance the hydrofluoric acid travels into the auxiliary cladding 16 is controlled by those factors that affect capillary action and is schematically represented by the horizontal dashed line in FIG. 3. The hydrofluoric acid is effective to etch through or otherwise dissolve the material in the connection zone 18 between the exterior of the cladding 14 and the interior wall of the auxiliary cladding 16. The concentration of the hydrofluoric acid and the time that the acid is allowed to etch or effect dissolution of the connection zone 18 can be best determined empirically. After the connection zone 18 is etched by the acid and the cladding 14 is freed of the interior of the axiliary cladding 16, the auxiliary cladding is fractured in an area where the cladding 14 is free of its bond to the auxiliary cladding 16, as schematically illustrated by the fracture line "L" in FIG. 3A. Thereafter, the axiliary cladding 16 is stripped from the end of the freed cladding 14 and core 12 as shown in FIG. 3B. The so-prepared optical fiber 10 should be washed or otherwise treated to remove any hydrofluoric acid residue.

After preparation of the end of the optical fiber 10 as shown in FIGS. 3-3B, the optical fiber 10 can be laterally coupled to other fibers, for example, another similarly prepared fiber, as illustrated generally in FIG. 4. The inner fibers 11 and 11' are aligned laterally adjacent to each other to effect evanescent field coupling. When aligned, the two fibers 11 and 11' may be fused to one another thermally or cemented in place using one of several known fiber cementing compounds including clear silicone adhesives. The optical connection can be structurally reinforced by applying a mixture of a plastic bonding material or resin mixed with silica-based fibers, with or without a splinting member, as generally illustrated by the enclosed dotted line area of FIG. 4.

FIG. 5 illustrates an optical fiber 20 in accordance with the present invention that includes a single-mode core 22, a cladding layer 24, and an auxiliary cladding 26. The core 22 and the cladding 24 are supported within the auxiliary cladding 26 by first and second diametrically aligned connecting webs 28 and 28' that extend between the outside diameter surface of the cladding 24 and the interior wall surface of the auxiliary cladding 26. The webs 28 and 28' serve the same connecting purpose as the connection zone 18 of the optical fiber 10 of FIGS. 1 and 2. In addition, as described and claimed in the commonly assigned application by the present inventor Ser. No. (602,739) filed on Apr. 23, 1984, now U.S. Pat. No. 4,630,889 entitled "Polarization Locked Optical Fiber and Method", a differential coefficient of thermal expansion may be provided between the auxiliary cladding 26 and the webs 28 and 28' and/or the core 22 and cladding 24 combination to stress the core 22 to induce birefringence, which, in turn, yields polarization-locking characteristics. Since the webs 28 and 28' serve to space the core 22 and cladding 24 combination from the interior wall of the auxiliary cladding 26, external forces that can be transmitted to the core 22 are reduced and thus perturbations minimized in the phase-locking characteristics.

The optical fiber 20 can be spliced to another fiber of similar construction using the splicing procedure described above in relationship to FIGS. 3-4. The diluted hydrofluoric acid, when introduced into the end portion of the optical fiber 20, is effective to etch away or otherwise dissolve the supporting webs 28 and 28'. After dissolution of the webs 28 and 28', the outer auxiliary cladding 26 may be removed from the freed cladding 24 and the optical fiber spliced as described above.

Figure 6:
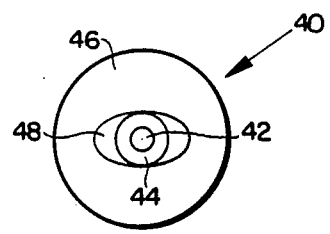
FIG. 6 is a cross-sectional end view of still another embodiment of an optical fiber in accordance with the present invention.

FIG. 6 illustrates another embodiment of an optical fiber 40 in accordance with the present invention which includes a single-mode core 42, a cladding layer 44, and an auxiliary cladding 46. The auxiliary cladding 46 is provided with an elliptical internal opening or cavity 48 with the cladding 44 and core 42 positioned within the cavity. Similar to the embodiment of FIG. 5, the material of the auxiliary cladding 46 which surrounds the centrally located cladding 44 and core 42 may be selected to have an annealing or set-up temperature or coefficient of thermal expansion which results in a strong clamping action being applied to the cladding 44 and core 42. The clamping action of the auxiliary cladding 46 against the cladding 44 and the core 42 stresses the cladding 44 and core 42 to provide a birefringence which then yields a polarization-locking characteristic.

The optical fiber 40 of FIG. 6 may be prepared for splicing in accordance with the steps illustrated in FIGS. 3-4 as described above. The end of the optical fiber 40 is dipped into dilute hydrofluoric acid which advances upwardly a selected distance into the cavity 48 by capillary action and etches the cladding 44 along the areas in contact with the auxiliary cladding 46. After etching is completed and the auxiliary cladding 46 is freed from the cladding 44, the cladding 46 is fractured to strip it from the freed cladding 44 and core 42. Thereafter, the so-prepared optical fiber 40 may then be laterally coupled to a fiber of like construction or another optical device. Of the fiber structures disclosed above, it is contemplated that the fiber structure of FIG. 6 is the best mode for carrying out the invention.

Figure 7:
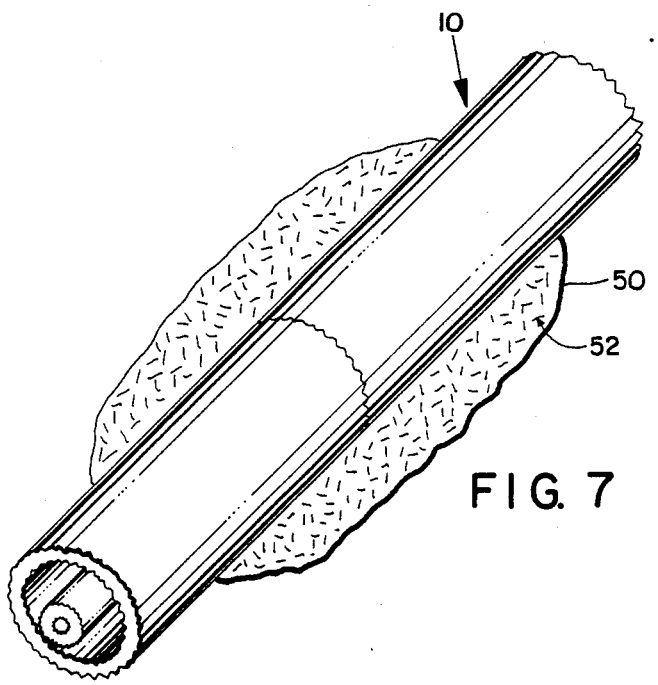
FIG. 7 is a cross-sectional side view of an optical fiber having a fractured auxiliary cladding splinted in accordance with the present invention.

In the various embodiments described above, the auxiliary cladding layers have a lower elongation tolerance than that of the comparatively thin cladding and core structures so that undue stressing of the optical fiber will cause a break or fracture in the auxiliary cladding prior to such a fracture occurring in the thinner cladding and core combination. In the event such a break occurs, the auxiliary cladding can be splinted so that it does not shear off the smaller cladding and core combination. As shown in FIG. 7, splinting can be effected by surrounding the auxiliary cladding in the area of the fracture with a plastic bonding material 50, for example, a resin mixed with silica-based fibers 52 to act as a splint. Because of the small diameter of the silica-based fibers and their multiplicity, the auxiliary cladding of the fiber will withstand a much greater tensile force than the inner fiber.

Thus, it will be appreciated that as a result of the present invention, a new highly effective optical fiber has been provided and method of splicing by which the principal objective, among others, is completely fulfilled. It will be equally apparent and contemplated that modifications and/or changes may be made in the illustrated embodiments without departure from the invention. Accordingly, it is expressly intended that the foregoing description and accompanying drawings are illustrative of preferred embodiments only, not limiting, and that the true spirit and scope of the present invention will be determined by reference to the appended claims.

What is claimed is:

1. A single mode optical fiber comprising a single mode inner fiber nested within an auxiliary cladding tube, said inner fiber comprising a core of given diameter fabricated from optical transmission material having an index of refraction $n_1$, and a cladding layer of optical transmission material having an index of refraction $n_2$, where $n_2$ is less than $n_1$, said cladding layer having a wall thickness ranging between one to two core diameters for enhancing lateral coupling to an inner fiber of similar construction, said auxiliary cladding tube being fabricated from material having an index of refraction not substantially greater than that of said cladding layer and of large inner diameter as compared to the outer diameter of said inner fiber such that said inner fiber is at least partially spaced from the inner diameter of said auxiliary cladding tube, and said inner fiber being in supporting engagement with and connected to the inside surface of said auxiliary cladding tube along a lineal connection zone.

2. The optical fiber of claim 1 wherein said inner fiber is in contact with and connected to the inside surface of said auxiliary cladding tube along a single lineal connection zone.

3. The optical fiber of claim 1, wherein said core is concentrically located within said cladding layer.

4. The optical fiber of claim 1, wherein said core and cladding layer are both circular in transverse cross-section and said auxiliary cladding tube comprises a hollow tube having inside and outside diameter surfaces, further comprising first and second webs connected between said cladding layer and the inside surface of said auxiliary cladding tube.

5. The optical fiber of claim 1 wherein said core and cladding layer are both circular in transverse cross-section and said auxiliary cladding tube comprises a hollow tube having a non-circular inside surface, and said cladding layer is in supporting contact on opposite sides with the non-circular inside surface of said auxiliary cladding tube.

6. The optical fiber of claim 5 wherein said non-circular inside surface is elliptical in transverse cross-section.

7. A method of splicing an optical fiber of the type having an inner fiber including a single-mode core and a first cladding within an auxiliary cladding tube of large inner diameter as compared to said inner fiber surrounding the inner fiber and in supporting contact along a lineal connection zone with the inner fiber, said method comprising the steps of:
 separating the supporting contact between said inner fiber and the auxiliary cladding tube by subjecting the lineal connection zone to an etching agent;
 removing at least a portion of the auxiliary cladding tube along a length to expose the separated inner fiber; and
 laterally coupling the core of said inner fiber to another core and cladding.

8. The method of claim 7 further comprising the step of splinting the lateral connection with a mixture of silica-based fibers and a bonding material.

* * * * *